April 5, 1966  L. F. ANDERSON ETAL  3,244,087
PHOTOGRAPHIC FLASHLAMP UNIT
Filed Jan. 2, 1964

LESTER F. ANDERSON
SEDGWICK R. BENNETT
DONALD W. HARTMAN
  INVENTORS

BY Joseph C. Ryan
  ATTORNEY

United States Patent Office 3,244,087
Patented Apr. 5, 1966

1

3,244,087
PHOTOGRAPHIC FLASHLAMP UNIT
Lester F. Anderson and Sedgwick R. Bennett, Williamsport, and Donald W. Hartman, Warrensville, Pa., assignors to Sylvania Electric Products Inc., a corporation of Delaware
Filed Jan. 2, 1964, Ser. No. 335,013
11 Claims. (Cl. 95—11)

This invention relates to photographic flashlamps and more particularly to the use of these lamps with photographic equipment.

Over the years the advances made in photographic equipment and in photographic light sources have been many and significant, not the least of which has been miniaturization. Cameras have become more and more compact; and photoflash lamps have also become smaller and smaller. One of the goals in the photographic field, even when the cameras and the flashlamps were much larger than they are today, has been the provision of some means for conveniently, inexpensively and artistically providing cameras with some sort of a flashlamp attachment which will include a supply of flashlamps and some simple automatic or semi-automatic means for sequentially presenting these flashlamps to the center of a reflector for taking pictures. The patent literature is replete with examples and illustrations of the efforts which have been exerted over the years to attain this goal; and yet these units are conspicuous by their absence commercially, particularly insofar as highly popular inexpensive cameras are concerned.

The flashlamp attachments which have been proposed heretofore have failed of widespread commercial success and application because of one or more significant deficiency or undesirable characteristic. Many of them were too expensive relatively speaking with respect to the line of cameras with which they were designed to be used. Many others were too large and too cumbersome to handle and manipulate, particularly with respect to the size of the cameras with which they were designed to be used. Still others had relatively complicated and thus expensive means for effecting automatic or semi-automatic sequential advancement of the flashlamp to a reflector for the actual picture-taking; and these were never sufficiently free of mechanical failures and/or operating malfunctions to be generally accepted commercially. Others were difficult to load. In nearly all cases it was necessary for the user to load lamps individually in magazines or turrets.

As cameras have become smaller and more compact, and as flashlamps have become smaller, the cost of both to the consumer has also decreased. Thus the requirements for a commercially acceptable flashlamp attachment have become more stringent rather than less; it must be smaller because the cameras are smaller, it must be smaller because the lamps are smaller and, as always, it must be inexpensive, mechanically simple but positive and aesthetically in harmony with the camera with which it will be employed. The provision of such a unit is the principal object of this invention.

This, and other objects, advantages and features are attained, in accordance with the principles of this invention by arranging a plurality of reflectors to define an assemblage, the cross section of which is substantially a regular polygon, and locating a photoflash lamp in operative relationship with respect to each of said reflectors. In a specific embodiment, a plurality of photoflash lamps are packaged in a container which has a plurality of transparent sides, one for each of the lamps. A plurality of reflectors are disposed in the container, one for each of the lamps. Thus each transparent side defines a window as it were within which a lamp is disposed, each lamp in turn being located in operative relationship with respect to its reflector.

Adaptation of cameras to this new flashlamp unit would require but few modifications, none of which would be major in nature. For example, the surface of the camera on which this new flashlamp unit would be disposed could be provided with a pair of electrical contacts and a spindle. The new flashlamp unit would be mounted on the camera with the spindle protruding into a suitable aperture centrally located in the bottom or base of the container. The pair of electrical contacts would be located so as to be disposed in cooperative relationship with the electrical contacts of one of the lamps in the flashlamp unit.

In the accompanying drawing.

Figure 1:
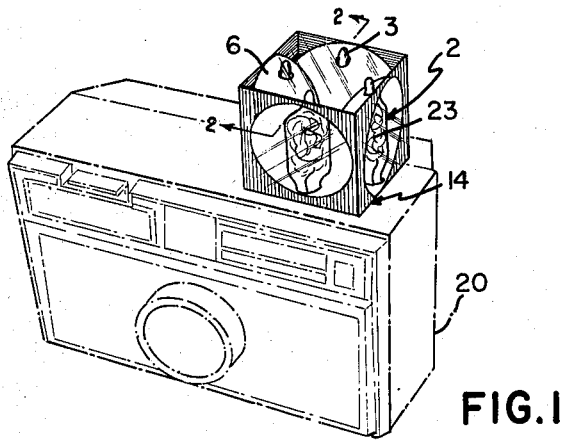
FIGURE 1 is a perspective view of a specific embodiment of a photographic flashlamp unit in accordance with the principles of this invention, the unit being shown atop a camera which is illustrated in phantom since it forms no part of this invention.

Referring now to the drawing, each of the photoflash lamps 2 illustrated therein comprises an hermetically sealed tubular lamp envelope 1 characterized by an exhaust tip 3 at one end thereof and a press 5 defining the other end thereof. Electrical contacts 7 and 9 are sealed in and project from the press 5, the inner ends of these electrical contacts 7 and 9 being lead-in wires 11 and 15 respectively. The lead-in wires 11 and 15 are maintained in spaced relationship with respect to one another, by an insulator button 17 if desired. The ignition system, in addition to the lead-in wires 11 and 15, comprises filament 19, which bridges and is secured to the lead-in wires, and a body of ignition paste 21 on the inner end of each of the lead-in wires. The lamp envelope is provided with a filling of combustible material such as shredded zirconium foil 23 and a combustion-supporting gas such as oxygen at a pressure of several atmospheres.

Figure 3:
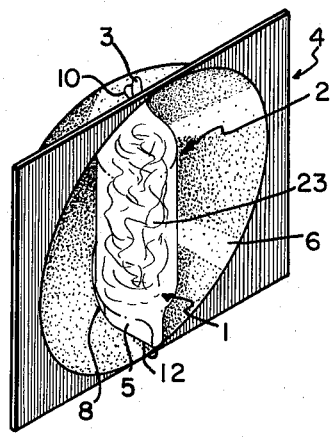
FIGURE 3 is a perpsective view of one of the lamp-reflector assemblies which comprise the photographic flashlamp unit of FIGURES 1 and 2.

As mentioned above, the photographic flashlamp unit of the invention comprises a plurality of reflectors arranged to define an assemblage, the cross section of which is substantially a regular polygon, and a photoflash lamp disposed in operative relationship with respect to each reflector. FIGURE 3 is a detail perspective of a specific example of one of these lamp-reflector assemblies, identified generally by the reference number 4. The lamp-reflector assembly 4 comprises a lamp 2 positioned in a reflector 6. The reflectors 6 are preferably of a suitable plastic material, such as cellulose acetate, polystyrene or polycarbonate, for example, and are provided with a coating or film of light-reflecting material. The lower portion of the reflector 6 may be provided with means, such as an aperture or recess 8 for example, to receive a lamp 2. The upper portion of the reflector 6 may be provided with an aperture or recess 10 to receive the top of a flashlamp, such as the exhaust tip 3 of the lamp 2. Thus, in the specific embodiment illustrated and described, a lamp 2 is positioned in its reflector 6 by insertion of the main body thereof through aperture 8 far enough so that the top thereof, tip 3, projects through aperture 10 and the bottom thereof, the lower longitudinal edge of press 5, rests on a shelf 12 defined by the lower edge of the reflector.

Figure 2:
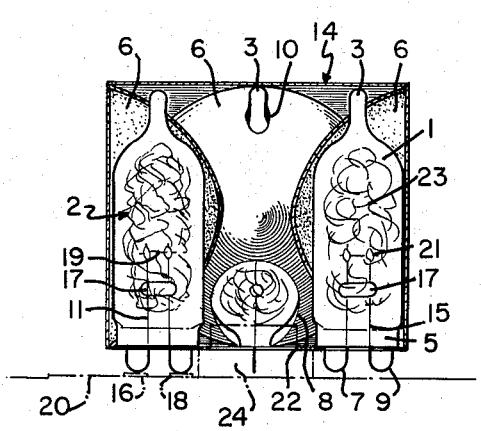
FIGURE 2 is a transverse sectional view of the photographic flashlamp unit of FIGURE 1 taken along the line 2—2 thereof.

Several of these lamp-reflector assemblies 4 are packaged in a container 14, preferably of a suitable plastic material such as cellulose acetate for example. The sides of the container 14 are transparent so that they function as windows for the lamp-reflector assemblies 4 which are disposed therein as shown in FIGURES 1 and 2. The base or bottom of the container 14 is provided with suitably located apertures so that the electrical contacts 7 and 9 of each lamp 2 may protrude therethrough and one pair of these contacts will be in engagement with electrical contacts 16 and 18 on the top of the camera 20 as shown particularly in FIGURE 2. The bottom of the container 14 is also provided with a centrally located aperture 22 (FIG. 2) into which a suitable mounting member such as a spindle 24 projects, thus providing a means for mounting the unit on the camera shown in FIGURE 1.

Although a specific example of a photographic flashlamp unit has been illustrated in the accompanying drawing and described above, it will be readily apparent to those skilled in the art that modifications thereof may be effected, embodying the principles and concepts of this invention and within the scope of the appended claims.

What we claim is:

1. A photographic flashlamp unit comprising: a container having a plurality of closed transparent sides; a plurality of reflectors disposed in said container, one along each side thereof; and a photoflash lamp disposed in operative relationship with respect to each of said reflectors and with the longitudinal axes of said lamps being substantially normal to the optical axes of their respective reflectors.

2. A photographic flashlamp unit comprising: a container rotatable about a central axis and having several closed transparent sides and a base; a plurality of reflectors disposed in said container, one along each substantially transparent side thereof, the optical axes of said reflector intersecting said central axis; and a photoflash lamp disposed in operative relationship with respect to each of said reflectors and with the longitudinal axes of said lamps being substantially normal to the optical axes of their respective reflectors, each lamp having electrical contacts depending therefrom and extending into said base.

3. A photographic flashlamp unit comprising: a substantially cube-shaped box with closed transparent sides; a plurality of reflectors disposed in said box, one along each side thereof, the optical axes of said reflectors substantially intersecting one another; and a photoflash lamp disposed in operative relationship with respect to each of said reflectors and with the longitudinal axes of said lamps being substantially normal to the optical axes of their respective reflectors.

4. For use with a camera having means for supporting a photographic flashlamp unit thereon, a photographic flashlamp unit comprising: a container rotatable about a central axis and having a plurality of closed transparent sides; a plurality of reflectors disposed in said container, one along each side thereof, the optical axes of said reflectors substantially intersecting said central axis; a photoflash lamp disposed in operative relationship with respect to each of said reflectors and with the longitudinal axes of said lamps being substantially normal to the optical axes of their respective reflectors; and means for positioning said unit on said supporting means.

5. For use with a camera having means for supporting a photographic flashlamp unit thereon and electrical contacts adjacent thereto, a photographic flashlamp unit comprising: a container rotatable about a central axis and having several closed transparent sides, and a base; a plurality of reflectors disposed in said container, one along each transparent side thereof, the optical axes of said reflectors substantially intersecting said central axis; and a photoflash lamp disposed in operative relationship with respect to each of said reflectors and with the longitudinal axes of said lamps being substantially normal to the optical axes of their respective reflectors, each lamp having electrical contacts depending therefrom and extending into said base, the electrical contacts of one of said lamps being engageable with said camera electrical contacts.

6. For use with a camera having means for supporting a photographic flashlamp unit thereon and electrical contacts adjacent thereto, a photographic flashlamp unit comprising: a substantially cube-shaped box with closed transparent sides and a bottom having apertures therein; a plurality of reflectors disposed in said box, one along each side thereof, the optical axes of said reflectors substantially intersecting one another; and a photoflash lamp disposed in operative relationship with respect to each of said reflectors and with the longitudinal axes of said lamps being substantially normal to the optical axes of their respective reflectors, each lamp having electrical contacts depending therefrom and extending through said apertures, the electrical contacts of one said lamps being engagable with said camera electrical contacts.

7. A photographic flashlamp unit comprising: a container having several closed transparent sides and a base; a plurality of reflectors disposed in said container, each of said reflectors facing one of said transparent sides; and a plurality of lamps, having electrical contacts depending therefrom, disposed in said container, each lamp being disposed in operative relationship with respect to one of said reflectors, with the longitudinal axes of said lamps being substantially normal to the optical axes of their respective reflectors and the electrical contacts of each of said lamps extending into said base.

8. A photographic flashlamp unit comprising: a transparent closed container rotatable about a central axis; a plurality of reflectors, arranged to define an assemblage, disposed in said container; and a plurality of photoflash lamps disposed in said container, each lamp being located within one of said reflectors and facing a wall of said transparent container whereby a window is provided for each of said lamps.

9. A photographic flashlamp unit comprising: a transparent, closed container rotatable about a central axis; a plurality of reflectors, arranged to define an assemblage, disposed in said container with the axis of each reflector substantially intersecting said central axis and being substantially normal thereto; and a plurality of photoflash lamps disposed in said container, each lamp being located within one of said reflectors with the longitudinal axis thereof being substantially normal to the reflector axis, each of said lamps facing a wall of said transparent container whereby a window is provided for each of said lamps.

10. A disposable package adapted to be mounted on a camera, said package comprising: a closed transparent container having a base; a plurality of reflectors arranged to define an assemblage disposed in said container; a plurality of photoflash lamps disposed in said container, each lamp being located within one of said reflectors and the longitudinal axes of said lamps being substantially normal to the optical axes of their respective reflectors, each lamp having electrical contacts depending therefrom and extending into said base; and means for detachably connecting said base to said camera.

11. A disposable package adapted to be mounted on a camera, said package comprising: a container having closed transparent sides and a base and being rotatable about central axis; a plurality of reflectors disposed in said container, one along each side thereof; a photoflash lamp disposed in each of said reflectors with the longitudinal axis of each lamp being substantially normal to the optical axis of its reflector, each lamp having electrical contacts depending therefrom and extending into said base; and means for detachably connecting said base to said camera.

References Cited by the Examiner
UNITED STATES PATENTS

| | | | |
|---|---|---|---|
| 3,071,681 | 1/1963 | Schmidt | 240—1.3 |
| 3,096,025 | 7/1963 | Prochnow | 240—1.3 |

JOHN M. HORAN, *Primary Examiner.*